US012580136B2

(12) United States Patent
Noda

(10) Patent No.: US 12,580,136 B2
(45) Date of Patent: Mar. 17, 2026

(54) SOLID ELECTROLYTIC CAPACITOR HAVING A SEALING VENT STRUCTURE

(71) Applicant: Murata Manufacturing Co., Ltd., Nagaokakyo (JP)

(72) Inventor: Tomohiro Noda, Nagaokakyo (JP)

(73) Assignee: MURATA MANUFUCTURING CO., LTD., Nagaokakyo (JP)

( * ) Notice: Subject to any disclaimer, the term of this patent is extended or adjusted under 35 U.S.C. 154(b) by 183 days.

(21) Appl. No.: 18/517,152

(22) Filed: Nov. 22, 2023

(65) Prior Publication Data

US 2024/0087818 A1     Mar. 14, 2024

Related U.S. Application Data

(63) Continuation of application No. PCT/JP2022/014518, filed on Mar. 25, 2022.

(30) Foreign Application Priority Data

May 26, 2021     (JP) ................................. 2021-088733

(51) Int. Cl.
H01G 9/15 (2006.01)
H01G 9/012 (2006.01)
H01G 9/042 (2006.01)

(52) U.S. Cl.
CPC .............. H01G 9/15 (2013.01); H01G 9/012 (2013.01); H01G 9/0425 (2013.01)

(58) Field of Classification Search
CPC ........ H01G 9/15; H01G 9/012; H01G 9/0425; H01G 9/08; H01G 9/10; H01G 9/12; H01G 2/14

USPC .................................................. 361/253, 521
See application file for complete search history.

(56) References Cited

U.S. PATENT DOCUMENTS 6,229,688 B1 * 5/2001 Kobayashi ............... H01G 9/15
361/523
2019/0214199 A1 7/2019 Ueda et al.

FOREIGN PATENT DOCUMENTS

| JP | H0555090 | A | * | 3/1993 |
| JP | 2001006986 | A | | 1/2001 |
| JP | 2001057321 | A | | 2/2001 |
| JP | 3413591 | B2 | | 6/2003 |
| JP | 2006093372 | A | * | 4/2006 |

(Continued)

OTHER PUBLICATIONS

International Search Report in PCT/JP2022/014518, mailed Jun. 14, 2022, 2 pages.

*Primary Examiner* — Sreeya Sreevatsa
(74) *Attorney, Agent, or Firm* — ArentFox Schiff LLP

(57) ABSTRACT

A solid electrolytic capacitor that includes: a capacitor element; a sealing material that seals the capacitor element to form a sealing body; and a vent structure embedded in the sealing material such that a portion of the vent structure is exposed on an outer surface of the sealing body, the vent structure being composed of a material that has a self-sealing valve action in which the vent structure turns into a melt at a reflow mounting temperature and the melt cleaves when receiving pressure of vaporized components generated inside the sealing body so as to form a hole communicating from an inside to the outer surface of the sealing body to discharge the vaporized components, and upon being cooled from the reflow mounting temperature, the melt flows and then solidifies so as to block the hole.

16 Claims, 9 Drawing Sheets

(56)  References Cited

FOREIGN PATENT DOCUMENTS

| JP | 2008270253 | A | * | 11/2008 | | |
|----|------------|---|---|---------|---|---|
| JP | 2018142668 | A | | 9/2018 | | |
| WO | WO-2016002220 | A1 | * | 1/2016 | .............. | H01G 9/12 |
| WO | 2018061535 | A1 | | 4/2018 | | |

* cited by examiner

112

132

113

133a

133b

114

134

115

135

136
116

117
137

138
118

139
119

SOLID ELECTROLYTIC CAPACITOR HAVING A SEALING VENT STRUCTURE

CROSS REFERENCE TO RELATED APPLICATIONS

The present application is a continuation of International application No. PCT/JP2022/014518, filed Mar. 25, 2022, which claims priority to Japanese Patent Application No. 2021-088733, filed May 26, 2021, the entire contents of each of which are incorporated herein by reference.

TECHNICAL FIELD

The present invention relates to solid electrolytic capacitors.

BACKGROUND ART

There is known a solid electrolytic capacitor including a solid electrolytic capacitor element and a sealing material formed of a resin for sealing the solid electrolytic capacitor element, in which a cathode terminal and an anode terminal are respectively drawn from the solid electrolytic capacitor element to the outside of the sealing material, and each of the terminals functions as an external electrode.

Moisture inevitably enters the solid electrolytic capacitor element, and internal pressure increases due to moisture vaporized during reflow mounting. An increase in internal pressure may cause an electrical defect or a crack. When the vaporized moisture inside the solid electrolytic capacitor element rapidly escapes, a tombstone phenomenon or a defect such as positional displacement may occur.

The following measures against the phenomenon have been studied.

In Patent Literature 1, grooves are formed in anode and cathode terminals, a moisture moving path is extended from outside to an element along an interface between an exterior body and each of the terminals, thereby preventing moisture from entering.

In Patent Literatures 2 and 3, holes are provided on an exterior body, on the end surface, and in the vicinity of an element or anode and cathode terminals, to discharge vaporized moisture during reflow mounting, whereby the internal pressure is reduced, the outflow direction of the vaporized moisture is controlled, and defects such as the tombstone phenomenon are reduced.

In Patent Literature 4, a material having high water vapor permeability is disposed in an exterior body so as to form a ventilation hole from the inside to the outside, thereby suppressing an increase in internal pressure.

In Patent Literature 5, a material having a melting point lower than the temperature during reflow mounting is disposed in a portion of each of anode and cathode terminals to be bonded to an exterior member, whereby the material is melted during reflow mounting, vaporized moisture is discharged from the melted portion, and an increase in internal pressure is reduced.

Patent Literature 1: WO 2018/061535 A
Patent Literature 2: JP 3413591 B
Patent Literature 3: JP 2018-142668 A
Patent Literature 4: JP 2001-057321 A
Patent Literature 5: JP 2008-270253 A

SUMMARY OF INVENTION

In Patent Literature 1, a moisture moving path is extended, thereby preventing moisture from entering. However, it is not possible to sufficiently prevent moisture from entering, because moisture enters from the entire exterior body. Further, the extension of the moisture moving path leads to an extension of the moisture discharging path, and it is also assumed that an increase in internal pressure during reflow mounting is rather promoted.

In Patent Literatures 2, 3, and 4, holes, a material having high water vapor permeability, and a material that melts during reflow mounting are provided, whereby vaporized moisture is discharged, and the internal pressure during reflow mounting is reduced. However, when the holes and the material having high water vapor permeability are present in the exterior body at the stage of functioning as the mounted electronic component on a circuit, the portion of the holes or material becomes a path that facilitates entry of moisture and oxygen into the interior. When moisture or oxygen enters the inside of the exterior body at the stage of functioning on the circuit, the element is deteriorated, and the capacitor life is reduced.

In Patent Literature 5, a material that melts during reflow mounting is provided, but the material is disposed on the entire path from the inside to the outside, a hole serving as a discharge port is not formed unless the internal pressure increases.

As described above, any of the methods described in the related art cannot sufficiently solve the problem caused by vaporization of moisture present in the solid electrolytic capacitor element during reflow mounting.

The present invention has been made to solve the above problem, and an object of the present invention is to provide a solid electrolytic capacitor in which occurrence of a defect due to vaporization of moisture present in the solid electrolytic capacitor element during reflow mounting is inhibited.

A solid electrolytic capacitor according to a first aspect of the present invention includes: a capacitor element that has a valve-action metal substrate having an anode terminal region and a cathode formation region, a dielectric layer on the cathode formation region, a solid electrolyte layer on the dielectric layer, and a conductive layer on the solid electrolyte layer; a sealing material that seals the capacitor element to form a sealing body; and a vent structure embedded in the sealing material such that a portion of the vent structure is exposed on an outer surface of the sealing body, the vent structure being composed of a material that has a self-sealing valve action in which the vent structure turns into a melt at a reflow mounting temperature and the melt cleaves when receiving pressure of vaporized components generated inside the sealing body so as to form a hole communicating from an inside to the outer surface of the sealing body to discharge the vaporized components, and upon being cooled from the reflow mounting temperature, the melt flows and then solidifies so as to block the hole.

A solid electrolytic capacitor according to a second aspect of the present invention includes: a capacitor element that has a valve-action metal substrate having an anode terminal region and a cathode formation region, a dielectric layer on the cathode formation region, a solid electrolyte layer on the dielectric layer, and a conductive layer on the solid electrolyte layer; a sealing material that seals the capacitor element to form a sealing body; and a vent structure embedded in the sealing material such that a portion of the vent structure is exposed on an outer surface of the sealing body, in which the vent structure is formed of a material having a melting point of 240° C. or lower, and includes a thin wall portion having a partially short dimension in a direction from an inside of the sealing body toward the outer surface, as viewed from the top thereof.

According to the present invention, it is possible to provide a solid electrolytic capacitor in which occurrence of a defect due to vaporization of moisture present in the solid electrolytic capacitor element during reflow mounting is inhibited.

DETAILED DESCRIPTION OF THE PREFERRED EMBODIMENTS

Figure 1:
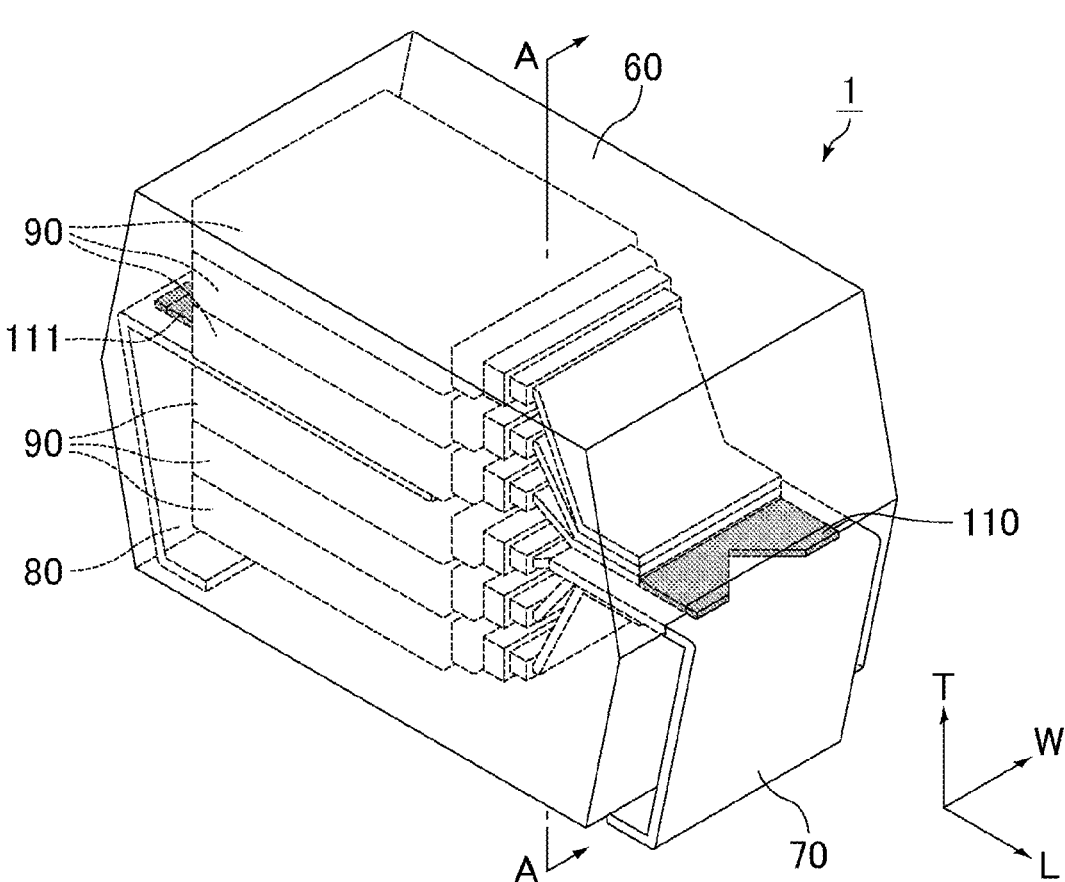
FIG. 1 is a schematic perspective view of an example of a solid electrolytic capacitor of a first embodiment.

A solid electrolytic capacitor of the present invention is described below.

The present invention is not limited to the following preferred embodiments, and may be suitably modified without departing from the gist of the present invention. Combinations of two or more preferred features of the present invention described hereinbelow are also within the scope of the present invention.

A solid electrolytic capacitor according to a first aspect of the present invention includes: a capacitor element that has a valve-action metal substrate having an anode terminal region and a cathode formation region, a dielectric layer on the cathode formation region, a solid electrolyte layer on the dielectric layer, and a conductive layer on the solid electrolyte layer; a sealing material that seals the capacitor element to form a sealing body; and a vent structure embedded in the sealing material such that a portion of the vent structure is exposed on an outer surface of the sealing body, the vent structure being composed of a material that has a self-sealing valve action in which the vent structure turns into a melt at a reflow mounting temperature and the melt cleaves when receiving pressure of vaporized components generated inside the sealing body so as to form a hole communicating from an inside to the outer surface of the sealing body to discharge the vaporized components, and upon being cooled from the reflow mounting temperature, the melt flows and then solidifies so as to block the hole.

The solid electrolytic capacitor according to the second aspect of the present invention includes: a capacitor element that has a valve-action metal substrate having an anode terminal region and a cathode formation region, a dielectric layer on the cathode formation region, a solid electrolyte layer on the dielectric layer, and a conductive layer on the solid electrolyte layer; a sealing material that seals the capacitor element to form a sealing body; and a vent structure embedded in the sealing material such that a portion of the vent structure is exposed on an outer surface of the sealing body, in which the vent structure is formed of a material having a melting point of 240° C. or lower, and includes a thin wall portion having a partially short dimension in a direction from an inside of the sealing body toward the outer surface, as viewed from the top thereof.

Hereinafter, the solid electrolytic capacitor according to the first aspect of the present invention and the solid electrolytic capacitor according to the second aspect of the present invention will be collectively described. When the solid electrolytic capacitor according to the first aspect of the present invention and the solid electrolytic capacitor according to the second aspect of the present invention are not distinguished from each other in the following description, each of them is simply referred to as "solid electrolytic capacitor of the present invention".

First Embodiment

The solid electrolytic capacitor of the first embodiment includes a lead frame connected to an anode terminal region or a cathode formation region.

The lead frame is drawn out of a sealing material.

A vent structure is provided on the surface of the lead frame.

FIG. 1 is a schematic perspective view of an example of a solid electrolytic capacitor of a first embodiment.

A solid electrolytic capacitor 1 shown in FIG. 1 has a sealing body 60 formed by sealing a plurality of solid electrolytic capacitor elements 90 with a sealing material, and includes a lead frame 70 connected to an anode terminal region and a lead frame 80 connected to a cathode formation region.

A vent structure 110 is provided on the surface of the lead frame 70, and a vent structure 111 is provided on the surface of the lead frame 80. The vent structure 110 and the vent structure 111 are exposed on the surface of the sealing material. The vent structure 110 and the vent structure 111 are embedded in the sealing material so as to be partially exposed on the outer surface of the sealing body 60.

FIG. 1 shows a longitudinal direction (L direction), a width direction (W direction), and a thickness direction (T direction) of the solid electrolytic capacitor.

The longitudinal direction (L direction) of the solid electrolytic capacitor is also the longitudinal direction of the lead frame.

Figure 2:
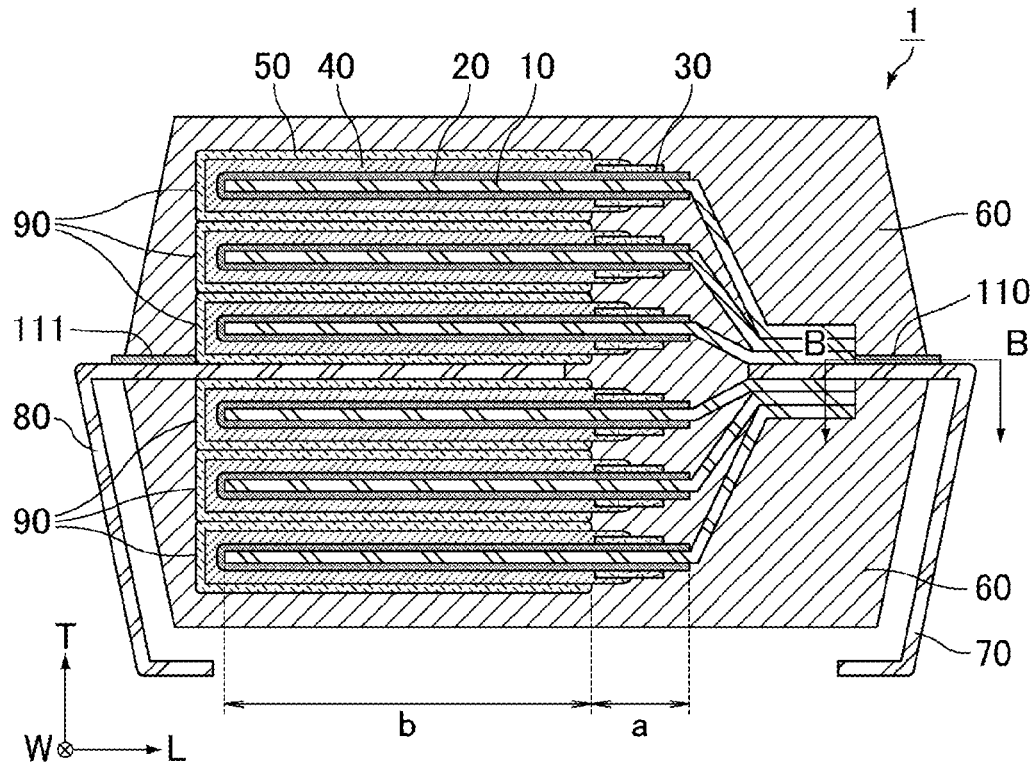
FIG. 2 is a cross-sectional view taken along line A-A of the solid electrolytic capacitor shown in FIG. 1.

FIG. 2 is a cross-sectional view taken along line A-A of the solid electrolytic capacitor shown in FIG. 1.

The solid electrolytic capacitor 1 shown in FIG. 2 includes a plurality of solid electrolytic capacitor elements 90 (hereinafter, also simply referred to as "capacitor elements 90"), the lead frame 70 connected to the anode terminal region, the lead frame 80 connected to the cathode formation region, and the sealing body 60 formed of the sealing material.

The sealing body 60 (sealing material) seals the capacitor elements 90.

The sealing body 60 is formed so as to cover the whole capacitor element 90, a part of the lead frame 70, and a part of the lead frame 80. Examples of the material of the sealing body 60 (sealing material) include epoxy resins.

The capacitor elements 90 each include a valve-action metal substrate 10 having an anode terminal region (the region indicated by double-headed arrow a in FIG. 2) and a cathode formation region (the region indicated by double-headed arrow b in FIG. 2), a dielectric layer 20 formed on the anode terminal region a and the cathode formation region b, a solid electrolyte layer 40 formed on the dielectric layer 20, and a conductive layer 50 formed on the solid electrolyte layer 40.

A masking region including a masking material 30 for partitioning the anode terminal region a and the cathode formation region b and insulating the valve-action metal substrate 10 from the counter electrode is formed on the anode terminal region a. The masking region need not be formed in the capacitor element.

The valve-action metal substrate is formed of a valve action metal exhibiting a so-called valve action. Examples of the valve-action metal include a single metal such as aluminum, tantalum, niobium, titanium, or zirconium, or an alloy containing these metals. Of these, aluminum and an aluminum alloy are preferred.

The shape of the valve-action metal substrate is preferably flat, and is more preferably in the form of foil. Further, a porous layer such as an etching layer is preferably provided on the surface of the valve-action metal substrate. Since the valve-action metal substrate has the porous layer, the surface area of the valve-action metal substrate serving as an anode is increased. Thus, the capacity of the capacitor can be increased.

The dielectric layer is formed on the cathode formation region of the valve-action metal substrate, and is preferably formed of an oxide film of the valve-action metal. For example, when aluminum foil is used as a valve-action metal substrate, the aluminum foil is oxidized in an aqueous solution containing boric acid, phosphoric acid, adipic acid, a sodium salt or an ammonium salt thereof, or the like, whereby an oxide film can be formed.

The dielectric layer may be formed on the anode terminal region of the valve-action metal substrate, or need not be formed on the anode terminal region.

The solid electrolyte layer is formed on the dielectric layer on the cathode formation region.

When the valve-action metal substrate has a porous layer, the solid electrolyte layer preferably includes an inner layer infiltrated into the porous layer of the valve-action metal and an outer layer covering the outside of the inner layer. The inner layer and the outer layer may have the same composition or different compositions.

Examples of materials defining the solid electrolyte layer include conductive polymers having a skeleton of pyrrole, thiophene, aniline, or the like. A conductive polymer having a thiophene skeleton is, for example, poly(3,4-ethylenedioxythiophene) (PEDOT), or may be PEDOT:PSS which is a complex with a dopant (poly(styrene sulfonate) (PSS)).

A conductive layer is formed on the solid electrolyte layer. Preferably, the conductive layer is, for example, a carbon layer, a graphene layer, or a silver layer formed by applying a conductive paste such as a carbon paste, a graphene paste, or a silver paste. Further, the conductive layer may be a composite layer in which a silver layer is provided on a carbon layer or a graphene layer, or a mixed layer in which a carbon paste or a graphene paste is mixed with a silver paste.

Specifically, the conductive layer preferably includes a carbon layer as a base layer and a silver layer thereon, but may include only the carbon layer, or may include only the silver layer.

Examples of the material of the masking material include insulating resins such as a polyphenylsulfone resin, a polyethersulfone resin, a cyanate ester resin, a fluororesin (such as tetrafluoroethylene or a tetrafluoroethylene-perfluoroalkyl vinyl ether copolymer), a polyimide resin, a polyamideimide resin, and derivatives or precursors of these resins.

On the anode terminal region side, the valve-action metal substrates 10 of the capacitor elements 90 are put together by the lead frame 70 and drawn out of the sealing material (the sealing body 60).

The vent structure 110 is provided on the surface of the lead frame 70 on the anode side, and a part of the vent structure 110 is exposed on the outer surface of the sealing body 60.

On the cathode formation region side, the conductive layers 50 of the capacitor elements 90 are electrically connected to one another. Further, the conductive layers 50 are electrically connected to the lead frame 80 and drawn out of the sealing material (the sealing body 60).

The vent structure 111 is provided on the surface of the lead frame 80 on the cathode side, and a part of the vent structure 111 is exposed on the outer surface of the sealing body 60.

Hereinafter, the configuration and action of the vent structure provided on the surface of the lead frame and embedded in the sealing material such that a part of the vent structure is exposed on the outer surface of the sealing body will be described using the vent structure provided on the surface of the lead frame on the anode side as an example.

The vent structure of the solid electrolytic capacitor according to the first aspect of the present invention has a self-sealing valve action in which the vent structure turns into a melt at a reflow mounting temperature and receives pressure of vaporized components generated inside the sealing body, whereby a portion of the melt is cleaved, a hole communicating from the inside to the outer surface of the sealing body is formed, the vaporized components are discharged, and the melt, upon being cooled from the reflow mounting temperature, flows, and then solidifies such that the hole is blocked. As described above, the vent structure may have a self-sealing valve action in which the vent structure turns into a melt at a reflow mounting temperature, a hole communicating from the inside to the outside is formed due to the pressure of vaporized moisture, the vaporized moisture is discharged, and then the hole is blocked.

The vent structure of the solid electrolytic capacitor according to the second aspect of the present invention is formed of a material having a melting point of 240° C. or lower, and includes a thin wall portion having a partially short dimension in a direction from the inside of the sealing body toward the outer surface, as viewed from the top thereof. As described above, the solid electrolytic capacitor may include a thin wall portion formed of a material having a melting point of 240° C. or lower and having a partially short dimension in a direction from the inside to the outside of the solid electrolytic capacitor, as viewed from the top thereof.

Hereinafter, a vent structure including both the characteristics of the vent structure of the solid electrolytic capacitor according to the first aspect and the characteristics of the vent structure of the solid electrolytic capacitor according to the second aspect will be described.

Figure 3:
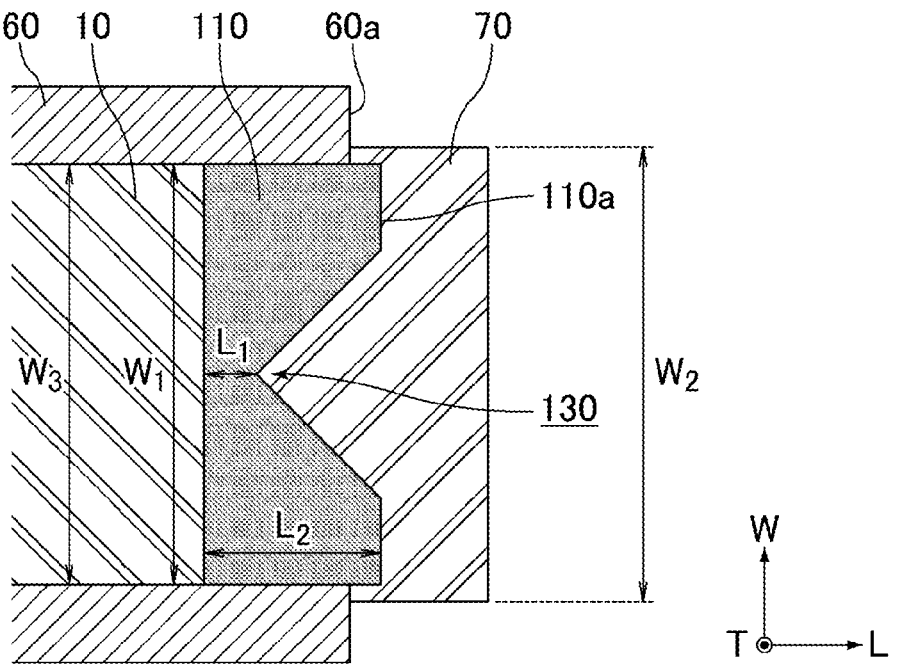
FIG. 3 is a top view schematically showing the surface of a vent structure of the solid electrolytic capacitor shown in FIG. 2 as viewed from the top along line B-B.

FIG. 3 is a top view schematically showing the surface of a vent structure of the solid electrolytic capacitor shown in FIG. 2 as viewed from the top along line B-B.

The vent structure 110 is provided on the surface of the lead frame 70. A part of the vent structure 110 is exposed on an outer surface 60a of the sealing body 60.

The vent structure 110 has a thin wall portion 130 as viewed from the top. The thin wall portion 130 is a portion having a partially short dimension in a direction from the inside of the sealing body 60 toward the outer surface, as viewed from the top.

In the vent structure 110 shown in FIG. 3, the direction from the inside of the sealing body 60 toward the outer surface, as viewed from the top, is defined as a longitudinal direction (L direction) of the solid electrolytic capacitor.

Then, the dimension of one portion (short part) in the L direction of the vent structure (the dimension indicated by double-headed arrow $L_1$ in FIG. 3) is compared with the dimension of the other portion (longest part) in the L direction of the vent structure (the dimension indicated by double-headed arrow $L_2$ in FIG. 3), and the portion having a short dimension in the L direction of the vent structure is defined as a thin wall portion.

The vent structure is formed of a material having a melting point of 240° C. or lower. The material having a melting point of 240° C. or lower melts at a reflow mounting temperature (e.g. 240° C. or higher and 260° C. or lower).

The melting point of the material having a vent structure can be measured by differential scanning calorimetry (DSC).

The vent structure has a self-sealing valve action in which the vent structure turns into a melt at a reflow mounting temperature and receives pressure of vaporized components generated inside the sealing body, whereby a portion of the melt is cleaved, a hole communicating from the inside to the outer surface of the sealing body is formed, the vaporized components are discharged, and the melt, upon being cooled from the reflow mounting temperature, flows, and then solidifies such that the hole is blocked.

This action will be described with reference to the drawings.

FIGS. 4A to 4D are top views each schematically showing a self-sealing valve action of the vent structure.

Figure 4A:
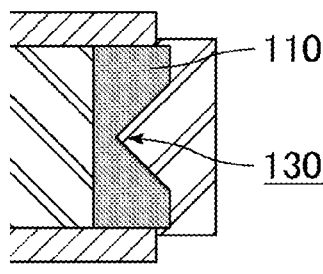
FIGS. 4A to 4D are top views each schematically showing a self-sealing valve action of the vent structure.

FIG. 4A shows the vent structure 110 before reflow mounting.

Figure 4B:
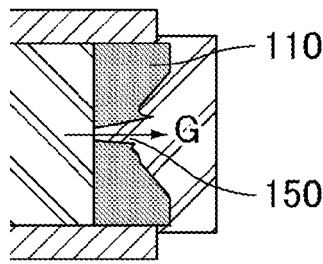

FIG. 4B shows the vent structure 110 during reflow mounting. When the solid electrolytic capacitor is heated in the reflow mounting process, the material constituting the vent structure melts and turns into a melt. At the same time, the internal pressure in the solid electrolytic capacitor, i.e. the pressure of the vaporized components generated inside the sealing body increases. A part of the melt, specifically, the thin wall portion 130 of the vent structure is broken by the pressure of the vaporized components, a hole 150 communicating from the inside to the outer surface of the sealing body is formed, and a vaporized moisture G is discharged from the hole 150.

Figure 4C:
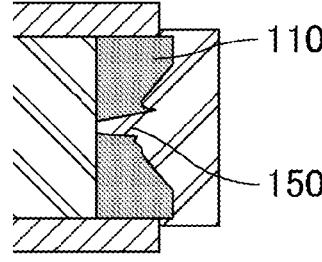
Figure 4D:
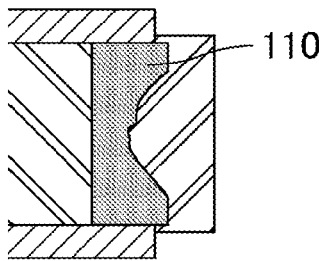

FIGS. 4C and 4D each show the vent structure 110 after the vaporized moisture G has been discharged.

FIG. 4C shows a state in which the discharge of the vaporized moisture G from the hole 150 is completed.

After the vaporized moisture G is discharged from the hole 150, when the solid electrolytic capacitor is cooled from the reflow mounting temperature, the vent structure 110 is still a melt and is present in a molten state around the hole 150. As shown in FIG. 4D, the melt flows and spreads due to surface tension, and this enables the hole 150 to be blocked. After the hole 150 is blocked, the melt is cooled to a temperature equal to or lower than the melting point thereof and solidified.

As described above, the vent structure has a self-sealing valve action in which the vent structure turns into a melt at a reflow mounting temperature and receives pressure of vaporized components generated inside the sealing body, whereby a portion of the melt is cleaved, a hole communicating from the inside to the outer surface of the sealing body is formed, the vaporized components are discharged, and the melt, upon being cooled from the reflow mounting temperature, flows, and then solidifies such that the hole is blocked.

The thin wall portion is a portion intentionally provided such that the melt receives pressure of vaporized components generated inside the sealing body, whereby a portion of the melt is cleaved, and a hole communicating from the inside to the outer surface of the sealing body is formed.

During reflow mounting, it is possible to prevent an increase in internal pressure due to vaporized moisture. Then, the hole of the vent structure is blocked after the vaporized moisture is discharged, and thus it is possible to prevent a path through which moisture or oxygen enters from the hole from remaining after the reflow mounting process.

From the above, it is possible to provide a solid electrolytic capacitor in which occurrence of a defect due to vaporization of moisture present in the solid electrolytic capacitor element during reflow mounting is inhibited.

Examples of the material constituting the vent structure include a mixture containing a thermoplastic resin having a melting point of 150° C. to 240° C., or a thermoplastic resin having a melting point of 150° C. to 240° C.

As the thermoplastic resin having a melting point of 150° C. to 240° C., at least one resin selected from the group consisting of polyamide, polypropylene, polyvinylidene fluoride, and polysulfone can be suitably used.

Alternatively, a metal or an alloy having a melting point of 180° C. to 240° C. can also be used.

As the metal or alloy having a melting point of 180° C. to 240° C., tin, a tin alloy, or the like can be suitably used.

In the direction from the inside of the sealing body toward the outer surface (from the inside to the outside of the solid electrolytic capacitor), the dimension of the thin wall portion is preferably ½ or less of the longest part dimension of the vent structure.

When the dimension of the thin wall portion is determined in this manner, a hole communicating from the inside to the outer surface of the sealing body is likely to be generated by the pressure of the vaporized moisture. The hole of the vent structure is easily blocked after the vaporized moisture is discharged.

When the dimension of the thin wall portion is larger than ½ of the longest part dimension of the vent structure, the dimension of the thin wall portion is not so short, a hole communicating from the inside to the outer surface of the sealing body may be less likely to be generated by the pressure of vaporized moisture.

In the direction from the inside of the sealing body toward the outer surface (from the inside to the outside of the solid electrolytic capacitor), the dimension of the thin wall portion is preferably $\frac{1}{20}$ or more of the longest part dimension of the vent structure. When the dimension of the thin wall portion is too short, a hole is formed in the thin wall portion before reflow mounting, and the hole may serve as an entry path of moisture and oxygen.

In the direction from the inside of the sealing body toward the outer surface (from the inside to the outside of the solid electrolytic capacitor), the dimension of the thin wall portion is preferably 0.8 mm or less. Further, the dimension of the thin wall portion is preferably 0.02 mm or more.

When the dimension of the thin wall portion is 0.02 mm to 0.8 mm, a hole communicating from the inside to the outer surface of the sealing body is likely to be generated by the pressure of vaporized moisture. The hole of the vent structure is easily blocked after the vaporized moisture is discharged.

The thickness of the vent structure is preferably 10 μm to 1 mm. When the thickness of the vent structure is determined in this manner, a hole communicating from the inside to the outer surface of the sealing body is likely to be generated by the pressure of the vaporized moisture. The hole of the vent structure is easily blocked after the vaporized moisture is discharged.

The dimension of the vent structure 110 in the width direction (the dimension in a direction orthogonal to the longitudinal direction of the lead frame, indicated by double-headed arrow $W_1$ in FIG. 3) is preferably shorter than the dimension of the lead frame 70 in the width direction (the dimension indicated by double-headed arrow $W_2$ in FIG. 3).

Further, the dimension of the vent structure 110 in the width direction is preferably the same as the dimension of the valve-action metal substrate 10 in the width direction (the dimension indicated by double-headed arrow $W_3$ in FIG. 3).

The dimension of the lead frame 70 in the width direction may be longer or shorter than the dimension of the valve-action metal substrate 10 in the width direction.

A part of the vent structure 110 is exposed on the outer surface of the sealing body 60, but as shown in FIG. 3, an end 110a of the vent structure 110 may slightly protrude outward from the outer surface 60a of the sealing body 60. Allowing the end of the vent structure to protrude outward from the outer surface of the sealing body makes it possible to prevent the sealing material from blocking the surface of the vent structure when sealing is performed with the sealing material.

Although FIG. 2 shows an example in which the vent structure is provided only on one surface of the lead frame, the vent structure may be provided on both surfaces of the lead frame.

The vent structure provided on the surface of the lead frame on the cathode side can also have the same configuration as the vent structure provided on the surface of the lead frame on the anode side. The vent structure provided on the surface of the lead frame on the cathode side also has the same function as the vent structure provided on the surface of the lead frame on the anode side. The vent structure may be provided on both the surface of the lead frame on the anode side and the surface of the lead frame on the cathode side, or may be provided on only one of the surfaces.

The shape of the vent structure as viewed from the top is, for example, a shape in which part of a rectangle is cut out by a triangle with a part of one side of the rectangle as a base as shown in FIG. 3, but other shapes may be used.

FIGS. 5A to 5F are top views schematically showing other examples of the shape of the vent structure.

In these examples, a thin wall portion having a short dimension in a direction from the inside of the sealing body toward the outer surface is located near the center of the vent structure in the width direction, and portions having long dimensions are located on both sides of the thin wall portion (the upper side and the lower side of the thin wall portion in each of the figures).

Figure 5A:
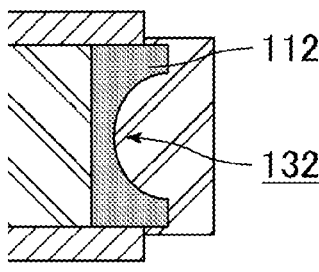
FIGS. 5A to 5F are top views schematically showing other examples of the shape of the vent structure.

A vent structure 112 with the shape shown in FIG. 5A is in a form in which a semicircle is cut out of a rectangle, the semicircle having a diameter corresponding to a part of one side of the rectangle, and has a thin wall portion 132.

Figure 5B:
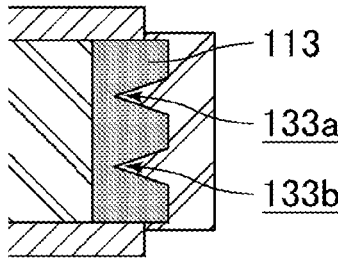

A vent structure 113 with the shape shown in FIG. 5B is in a form in which two triangles, with a part of one side of the rectangle as a base, are cut out of a rectangle. The vent structure 113 has two thin wall portions 133a and 133b. Hence, this is an example in which the vent structure has a plurality of thin wall portions.

Figure 5C:
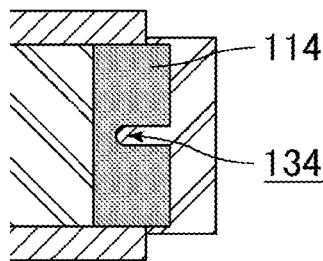

A vent structure 114 with the shape shown in FIG. 5C is in a form in which a part of an oval is cut out of a rectangle, the oval having a short diameter corresponding to a part of one side of the rectangle, and has a thin wall portion 134.

Figure 5D:
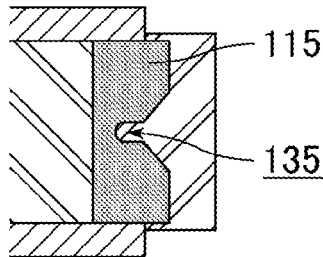

A vent structure 115 with the shape shown in FIG. 5D is in a form in which a triangle, with a part of one side of the rectangle as a base as shown in FIG. 3, is cut out of a rectangle, and a part of an oval is cut out of the vertex of the triangle (which is an end of the thin wall portion), and has the thin portion 135.

Figure 5E:
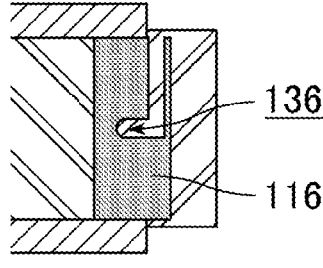

A vent structure 116 with the shape shown in FIG. 5E is in a form in which an L shape (the shape shown in FIG. 5E is a shape obtained by horizontally inverting the L shape) is cut out of part of a rectangle, and has a thin wall portion 136.

Figure 5F:
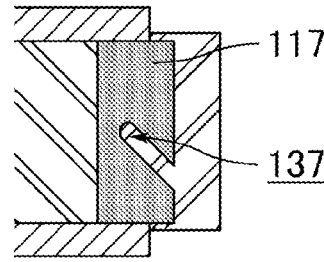

A vent structure 117 with the shape shown in FIG. 5F is in a form in which a part of an oval is cut out of a rectangle in a direction diagonally to one side of the rectangle, and has a thin wall portion 137.

Figure 6A:
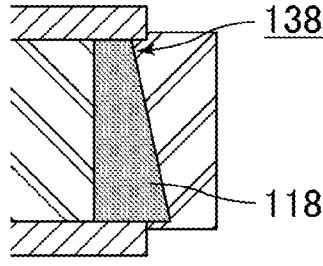
FIGS. 6A to 6C are top views schematically showing other examples of the shape of the vent structure.
Figure 6B:
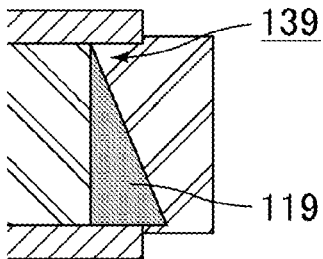
Figure 6C:
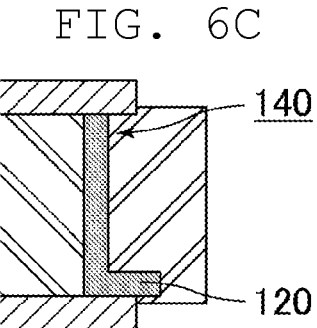

FIGS. 6A to 6C are top views each schematically showing another example of the shape of the vent structure.

A vent structure 118 with the shape shown in FIG. 6A is in a trapezoidal form, and a short side portion thereof is a thin wall portion 138.

A vent structure 119 with the shape shown in FIG. 6B is in a triangular form, and the vicinity of one vertex thereof is a thin wall portion 139.

A vent structure 120 with the shape shown in FIG. 6C is in an L form, and one side (long side in FIG. 6C) of the L shape extending in the width direction of the solid electrolytic capacitor is a thin wall portion 140.

Each of the vent structures shown in the above figures has a thin wall portion.

Thus, the vent structure has a self-sealing valve action in which the vent structure turns into a melt at a reflow mounting temperature and receives pressure of vaporized components generated inside the sealing body, whereby a portion of the melt is cleaved, a hole communicating from the inside to the outer surface of the sealing body is formed, the vaporized components are discharged, and the melt, upon being cooled from the reflow mounting temperature, flows, and then solidifies such that the hole is blocked.

A method for providing the vent structure on the surface of the lead frame in the step of producing the solid electrolytic capacitor is not limited.

For example, the vent structure can be provided by performing screen printing, dispenser coating, plating, or the like on the surface of the lead frame to form a layer of a material serving as the vent structure in a predetermined pattern having a thin wall portion.

Alternatively, the vent structure can also be provided on the surface of the lead frame by a method of preparing a resin film or the like formed (cut) into a predetermined pattern having a thin wall portion and having a shape to be a vent structure, and sticking the resin film to the surface of the lead frame.

In addition, the vent structure may be provided on the surface of the lead frame after the lead frame is welded to the capacitor element, or the lead frame may be welded to the capacitor element after the vent structure is provided on the surface of the lead frame.

The surface of the lead frame is preferably a position where the vent structure is provided so that the connection between the vent structure and the lead frame can be strengthened. Since the lead frame has a more robust structure than the material constituting the surface of the capacitor element, the vent structure and the lead frame can be strongly coupled.

In addition, when the vent structure is provided on the lead frame, a step of providing the vent structure can be easily added as compared with a case where the vent structure is provided at other positions. Thus, the vent structure is preferably provided on the surface of the lead frame.

Second Embodiment

The solid electrolytic capacitor according to the second embodiment includes: an anode external electrode connected to the anode terminal region; and a cathode external electrode electrically connected to the conductive layer in the cathode formation region.

The vent structure is provided in a portion where neither the anode external electrode nor the cathode external electrode is provided.

Figure 7:
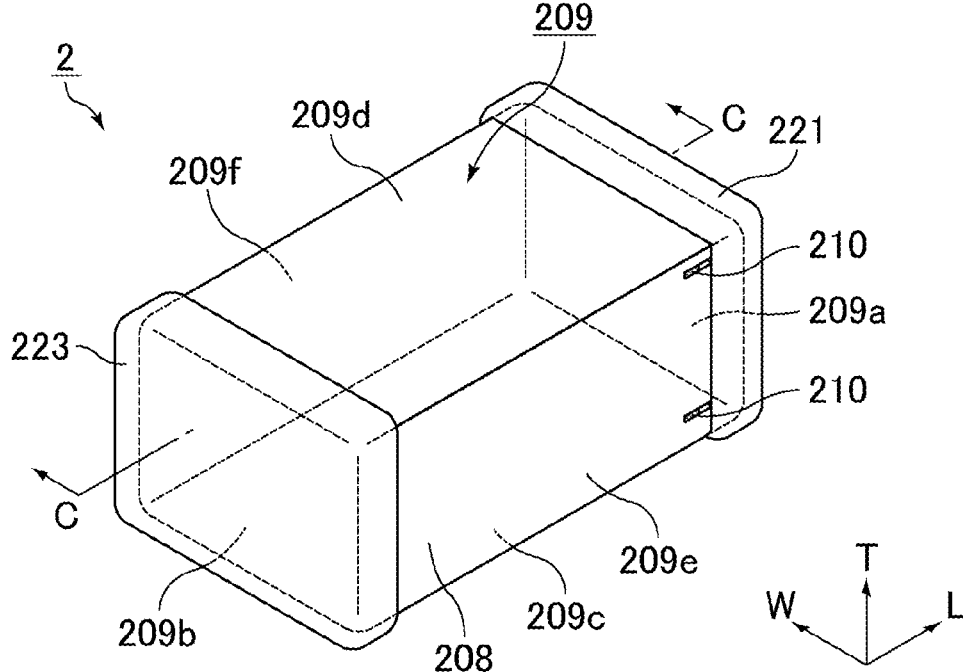
FIG. 7 is a schematic perspective view of an example of a solid electrolytic capacitor of a second embodiment.

FIG. 7 is a schematic perspective view of an example of a solid electrolytic capacitor of a second embodiment.

FIG. 7 shows a resin molded body 209 of a solid electrolytic capacitor 2.

The shape of the resin molded body is not limited, and any three-dimensional shape can be used. The resin molded body preferably has a cuboid shape. Further, the cuboid shape is not necessarily a word meaning a complete cuboid, and a surface forming the resin molded body may have a taper without being orthogonal to other surfaces, or may have a shape with chamfered corners.

FIG. 7 shows the cuboid resin molded body 209, and the resin molded body 209 has a length direction (L direction), a width direction (W direction), and a thickness direction (T direction).

The resin molded body 209 includes outer surfaces: a first end surface 209a and a second end surface 209b which are opposite to each other in the length direction. An anode external electrode 221 is formed on the first end surface 209a, and a cathode external electrode 223 is formed on the second end surface 209b.

The resin molded body 209 includes outer surfaces: a bottom surface 209c and a top surface 209d which are opposite to each other in the thickness direction.

The resin molded body 209 also includes outer surfaces: a first side surface 209e and a second side surface 209f which are opposite to each other in the width direction.

A vent structure 210 is exposed on the first side surface 209e, which is the outer surface of a sealing body 208, in the vicinity of the anode external electrode 221.

Although not shown in FIG. 7, the vent structure 210 is also exposed on the second side surface 209f, which is the outer surface of the sealing body 208, in the vicinity of the anode external electrode 221.

Figure 8:
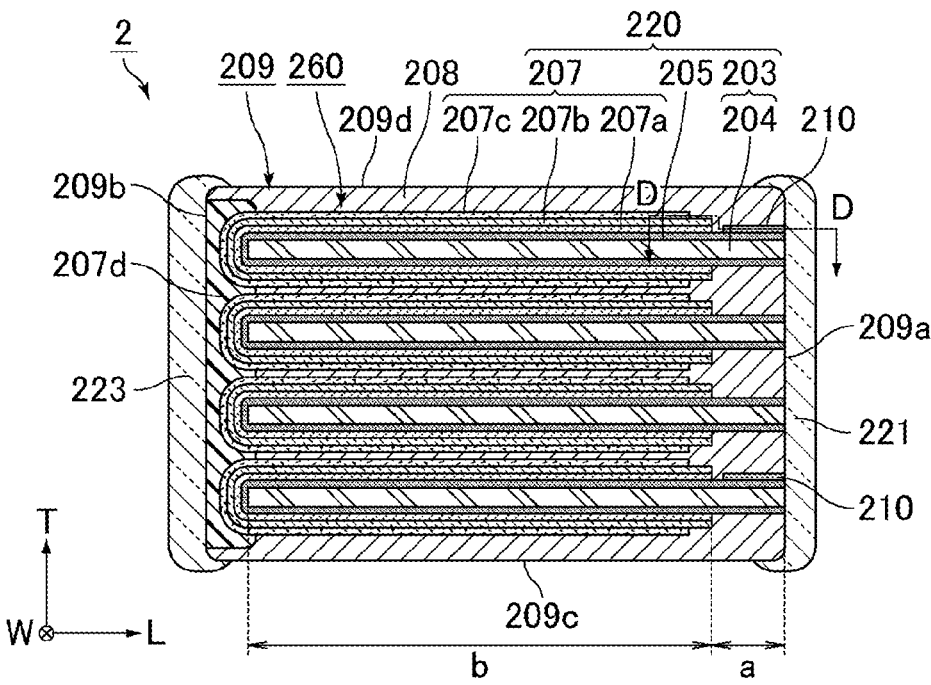
FIG. 8 is a cross-sectional view taken along line C-C of the solid electrolytic capacitor shown in FIG. 7.

FIG. 8 is a cross-sectional view taken along line C-C of the solid electrolytic capacitor shown in FIG. 7.

A capacitor element 220 includes an anode 203 having a dielectric layer 205 on a surface thereof and a cathode 207 opposite to the anode 203.

Multiple such capacitor elements 220 are stacked to form a stack 260, and the stack 260 is sealed with a sealing material to form the sealing body 208, and thus the resin molded body 209 is formed.

In the stack 260, the stacked capacitor elements 220 may be bonded to each other via a conductive adhesive (not shown). The number of capacitor element 220 included in the stack 260 may be one.

The anode external electrode 221 is formed on the first end surface 209a of the resin molded body 209, and the anode external electrode 221 is electrically connected to the anode 203 exposed on the first end surface 209a.

The cathode external electrode 223 is formed on the second end surface 209b of the resin molded body 209, and the cathode external electrode 223 is electrically connected to the cathode 207 exposed on the second end surface 209b.

A valve-action metal substrate 204 constituting the capacitor element 220 has an anode terminal region (the region indicated by double-headed arrow a in FIG. 8) and a cathode formation region (the region indicated by double-headed arrow b in FIG. 8). The dielectric layer 205 is formed on the anode terminal region a and the cathode formation region b.

The valve-action metal substrate 204 is not in direct contact with the solid electrolyte layer 207a or the conductive layer 207b at the end of the valve-action metal substrate 204 on the second end surface 209b side. When the second end surface 209b-side end of the valve-action metal substrate 204 is insulated, for example, by being covered with the dielectric layer 205, the second end surface 209b-side end of the valve-action metal substrate 204 may be covered with the solid electrolyte layer 207a and the conductive layer 207b.

The cathode 207 of the capacitor element 220 is a stack including the solid electrolyte layer 207a on the dielectric layer 205, the conductive layer 207b on the solid electrolyte layer 207a, and a conductive layer 207c on the conductive layer 207b.

The conductive layer 207c of each of the capacitor elements 220 is collected as a cathode lead-out portion 207d near the second end surface 209b and exposed on the second end surface 209b.

The conductive layer 207b, the conductive layer 207c, and the cathode lead-out portion 207d can be formed of a conductive paste such as a carbon paste, a graphene paste, an Ag paste, a copper paste, or a Ni paste.

Further, the conductive pastes constituting the conductive layer 207b, the conductive layer 207c, and the cathode lead-out portion 207d may have different compositions.

Preferred configurations of the valve-action metal substrate, the dielectric layer, the solid electrolyte layer, the conductive layer, and the sealing material can be the same as the configurations in the solid electrolytic capacitor of the first embodiment.

Hereinafter, the vent structure included in the solid electrolytic capacitor of the second embodiment will be described.

Figure 9:
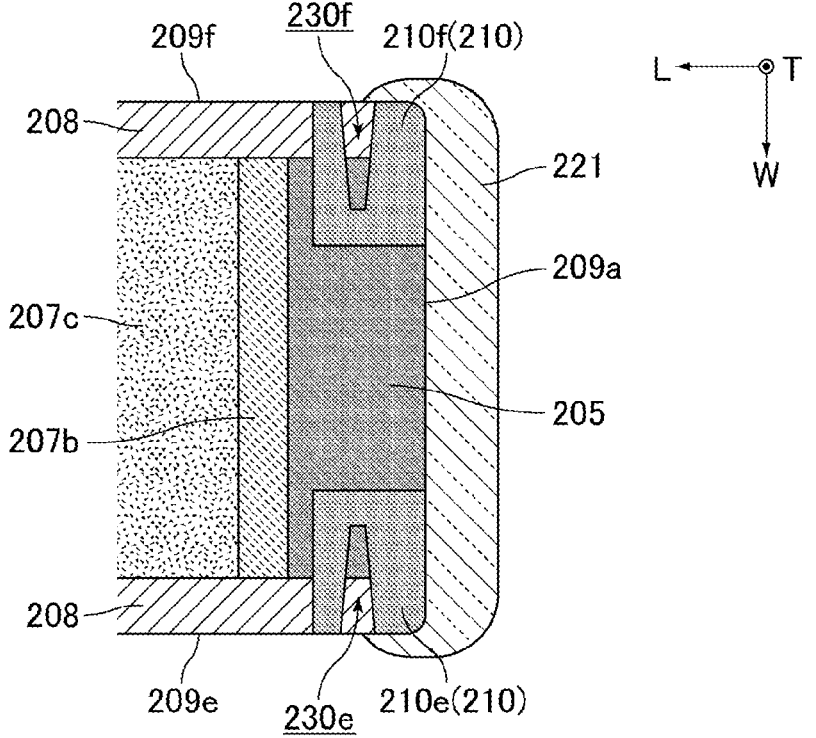
FIG. 9 is a top view schematically showing the surface of the vent structure of the solid electrolytic capacitor shown in FIG. 8 as viewed from above along line D-D.

FIG. 9 is a top view schematically showing the surface of the vent structure of the solid electrolytic capacitor shown in FIG. 8 as viewed from above along line D-D.

A vent structure 210e and a vent structure 210f are provided on the dielectric layer 205.

The vent structure 210e is provided so as to be exposed on the sealing body 208 on the first side surface 209e, and the vent structure 210f is provided so as to be exposed on the sealing body 208 on the second side surface 209f.

The vent structure 210e has a thin wall portion 230e as viewed from the top, and the vent structure 210f has a thin wall portion 230f as viewed from the top.

Similarly to the vent structure described in the first embodiment, the vent structure also has a self-sealing valve action in which the vent structure turns into a melt at a reflow mounting temperature and receives pressure of vaporized components generated inside the sealing body, whereby a portion of the melt is cleaved, a hole communicating from the inside to the outer surface of the sealing body is formed, the vaporized components are discharged, and the melt, upon being cooled from the reflow mounting temperature, flows, and then solidifies such that the hole is blocked.

In the vent structure 210 shown in FIG. 9, as viewed from the top, the direction from the inside of the sealing body 208 toward the outer surface is a width direction (W direction) of the solid electrolytic capacitor.

In the solid electrolytic capacitors shown in FIGS. 7, 8, and 9, among the capacitor elements constituting the stack, the surface of the uppermost capacitor element and the surface of the lowermost capacitor element each have a vent structure. Providing the vent structure in each of the positions makes it possible to sufficiently suppress an increase in the internal pressure due to the pressure of the vaporized moisture, but the position of the vent structure is not limited to these positions.

The vent structure may be provided in all the capacitor elements constituting the stack, or the vent structure may be provided in only one capacitor element.

Although FIG. 9 illustrates an example in which two vent structures are provided for one capacitor element, the number of vent structures may be one for one capacitor element.

Figure 10:
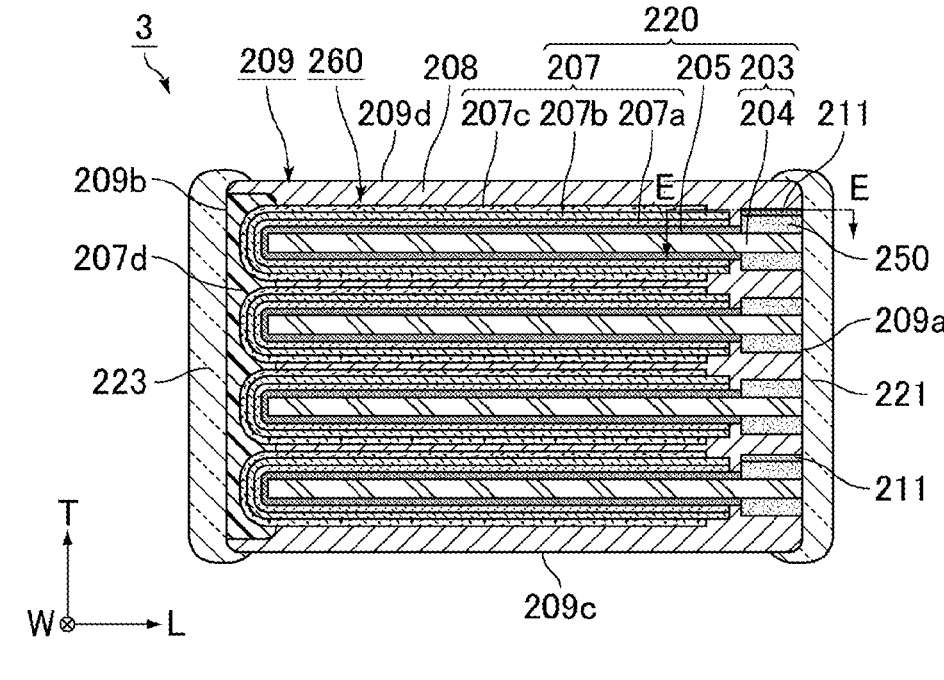
FIG. 10 is a cross-sectional view schematically showing another example of the solid electrolytic capacitor of the second embodiment.

FIG. 10 is a cross-sectional view schematically showing another example of the solid electrolytic capacitor of the second embodiment. A solid electrolytic capacitor 3 shown in FIG. 10 has a masking material 250 in the anode terminal region. A vent structure 211 is provided on the masking material 250.

Figure 11:
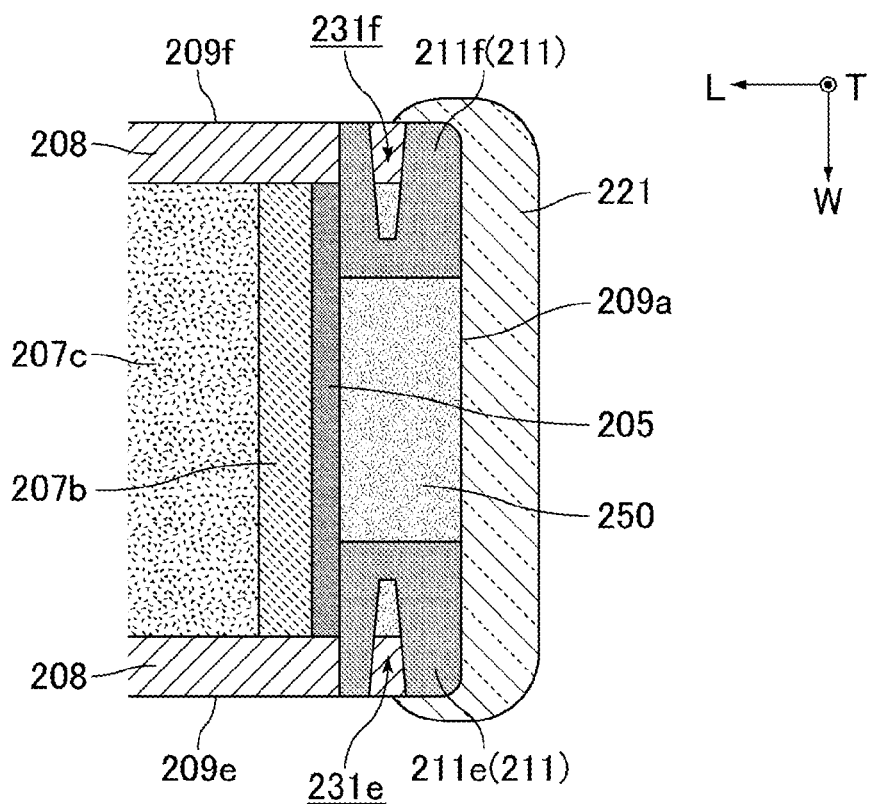
FIG. 11 is a top view schematically showing the surface of the vent structure of the solid electrolytic capacitor shown in FIG. 10 as viewed from the top along line E-E.

FIG. 11 is a top view schematically showing the surface of the vent structure of the solid electrolytic capacitor shown in FIG. 10 as viewed from the top along line E-E.

A vent structure 211e and a vent structure 211f are provided on the masking material 250.

The vent structure 211e is provided so as to be exposed on the sealing body 208 on the first side surface 209e, and the vent structure 211f is provided so as to be exposed on the sealing body 208 on the second side surface 209f.

The vent structure 211e has a thin wall portion 231e as viewed from the top, and the vent structure 211f has a thin wall portion 231f as viewed from the top.

Similarly to the vent structure described in the first embodiment, the vent structure also has a self-sealing valve action in which the vent structure turns into a melt at a reflow mounting temperature and receives pressure of vaporized components generated inside the sealing body, whereby a portion of the melt is cleaved, a hole communicating from the inside to the outer surface of the sealing body is formed, the vaporized components are discharged, and the melt, upon being cooled from the reflow mounting temperature, flows, and then solidifies such that the hole is blocked.

In FIG. 10, the masking material 250 is illustrated as being provided on the surface of the valve-action metal substrate 204, but the masking material 250 may be provided on the dielectric layer 205.

Figure 12:
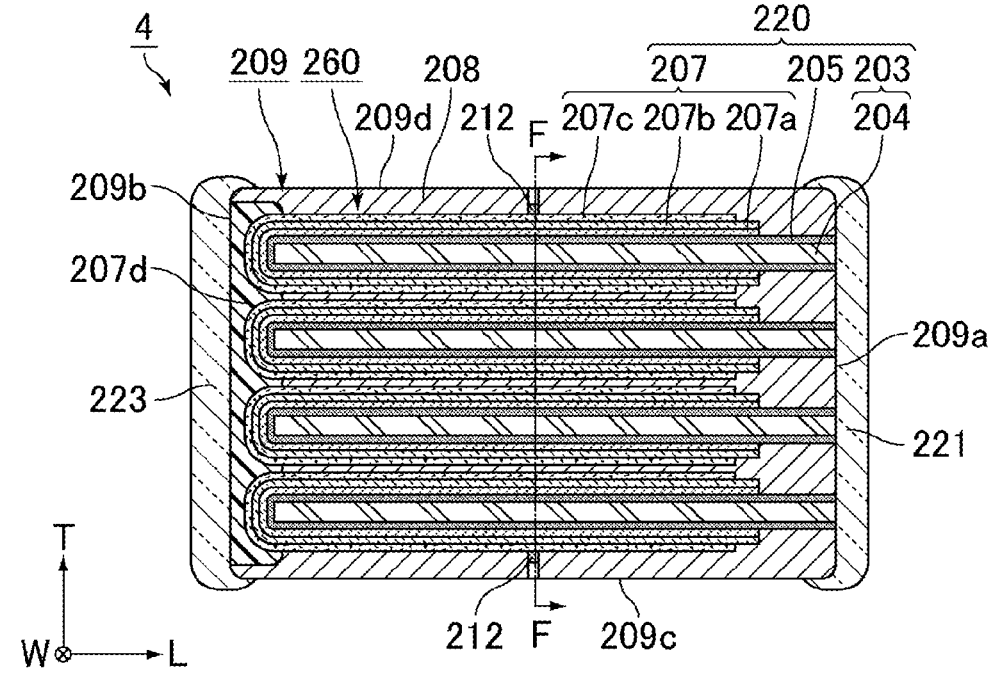
FIG. 12 is a cross-sectional view schematically showing still another example of the solid electrolytic capacitor of the second embodiment.

FIG. 12 is a cross-sectional view schematically showing another example of the solid electrolytic capacitor of the second embodiment. In a solid electrolytic capacitor 4 shown in FIG. 12, a vent structure 212 exposed on each of the bottom surface 209c and the upper surface 209d of the resin molded body 209 in the cathode formation region is provided.

Figure 13:
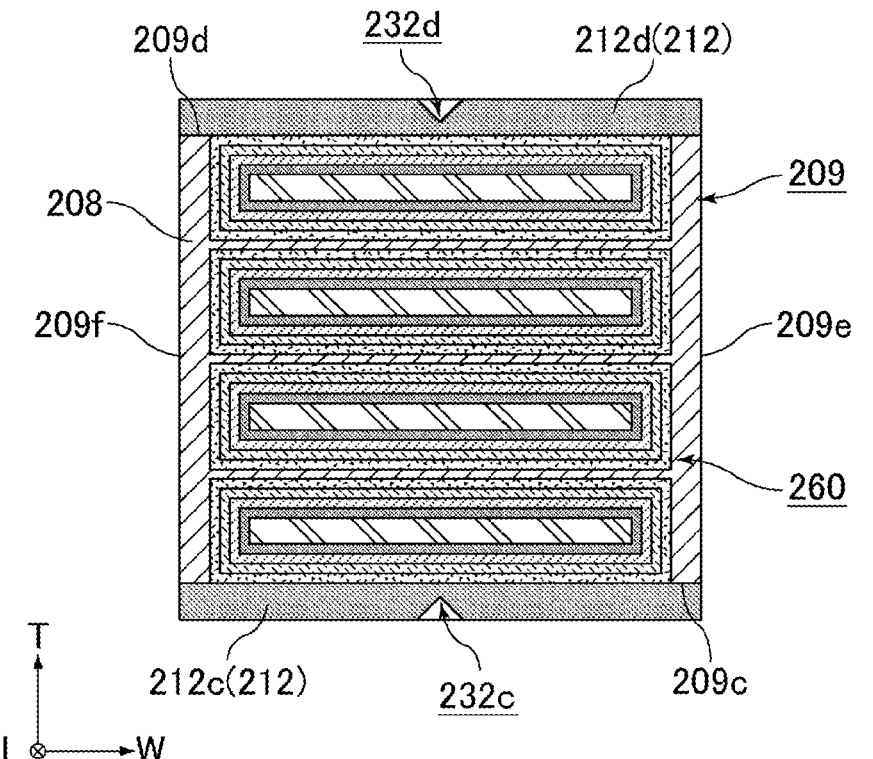
FIG. 13 is a cross-sectional side view schematically showing the surface of the vent structure of the solid electrolytic capacitor shown in FIG. 12 as viewed from the side along line F-F.

FIG. 13 is a cross-sectional side view schematically showing the surface of the vent structure of the solid electrolytic capacitor shown in FIG. 12 as viewed from the side along line F-F.

A vent structure 212c is provided so as to be exposed on the sealing body 208 on the bottom surface 209c, and a vent structure 212d is provided so as to be exposed on the sealing body 208 on the upper surface 209d.

The vent structure 212c has a thin wall portion 232c, and the vent structure 212d has a thin wall portion 232d.

In the vent structure 212 shown in FIG. 13, the direction from the inside of the sealing body 208 toward the outer surface is a thickness direction (T direction) of the solid electrolytic capacitor.

In the above description, the thin wall portion of the vent structure is defined focusing on the wording "in a direction from the inside of the sealing body toward the outer surface, as viewed from the top". However, when the direction from the inside of the sealing body toward the outer surface is the thickness direction of the solid electrolytic capacitor as shown in FIG. 13, the dimension focusing on the dimension as viewed from the side instead of from the top is read as the dimension as viewed from the top.

Similarly to the vent structure described in the first embodiment, the vent structure also has a self-sealing valve action in which the vent structure turns into a melt at a reflow mounting temperature and receives pressure of vaporized components generated inside the sealing body, whereby a portion of the melt is cleaved, a hole communicating from the inside to the outer surface of the sealing body is formed, the vaporized components are discharged, and the melt, upon being cooled from the reflow mounting temperature, flows, and then solidifies such that the hole is blocked.

REFERENCE SIGNS LIST 1, 2, 3, 4 solid electrolytic capacitor
10, 204 valve-action metal substrate
20, 205 dielectric layer
30, 250 masking material
40, 207a solid electrolyte layer
50, 207b, 207c conductive layer
60, 208 sealing body
60a outer surface of sealing body
70 lead frame (anode side)
80 lead frame (cathode side)
90, 220 solid electrolytic capacitor element (capacitor element)
110, 111, 112, 113, 114, 115, 116, 117, 118, 119, 120, 210, 210e, 210f, 211, 211e, 211f, 212, 212c, 212d vent structure 110*a* end of vent structure
130, 132, 133*a*, 133*b*, 134, 135, 136, 137, 138, 139, 140, 230*e*, 230*f*, 231*e*, 231*f*, 232*c*, 232*d*** thin wall portion
150 hole
203 anode
207 cathode
207*d*** cathode lead-out portion
209 resin molded body
209*a*** first end surface of resin molded body (outer surface of resin molded body)
209*b*** second end surface of resin molded body (outer surface of resin molded body)
209*c*** bottom surface of resin molded body (outer surface of resin molded body)
209*d*** top surface of resin molded body (outer surface of resin molded body)
209*e*** first side surface of resin molded body (outer surface of resin molded body)
209*f*** second side surface of resin molded body (outer surface of resin molded body)
221 anode external electrode
223 cathode external electrode
260 stack

The invention claimed is:

1. A solid electrolytic capacitor comprising:
a capacitor element that has a valve-action metal substrate having an anode terminal region and a cathode formation region, a dielectric layer on the cathode formation region, a solid electrolyte layer on the dielectric layer, and a conductive layer on the solid electrolyte layer;
a sealing material that seals the capacitor element to form a sealing body; and
a vent structure embedded in the sealing material such that a portion of the vent structure is exposed on an outer surface of the sealing body, the vent structure being composed of a material that has a self-sealing valve action in which the vent structure turns into a melt at a reflow mounting temperature and the melt cleaves when receiving pressure of vaporized components generated inside the sealing body so as to form a hole communicating from an inside to the outer surface of the sealing body to discharge the vaporized components, and upon being cooled from the reflow mounting temperature, the melt flows and then solidifies so as to block the hole,
the vent structure positioned between the sealing body and an anode lead drawn from the inside to the outer surface of the sealing body,
the material of the vent structure solidifying between the sealing body and the anode lead upon being cooled from the reflow mounting temperature.

2. The solid electrolytic capacitor according to claim 1, wherein in a direction from the inside of the sealing body toward the outer surface of the sealing body, the vent structure includes a thin wall portion that has a dimension that is ½ or less of a longest part dimension of the vent structure.

3. The solid electrolytic capacitor according to claim 2, wherein the dimension of the thin wall portion is ¹⁄₂₀ or more of the longest part dimension of the vent structure.

4. The solid electrolytic capacitor according to claim 2, wherein the dimension of the thin wall portion is 0.02 mm to 0.8 mm.

5. The solid electrolytic capacitor according to claim 1, wherein the vent structure has a thickness of 10 μm to 1 mm.

6. The solid electrolytic capacitor according to claim 1, further comprising:

a lead frame connected to the anode terminal region or the cathode formation region and drawn out of the sealing material,
wherein the vent structure is on a surface of the lead frame.

7. The solid electrolytic capacitor according to claim 1, further comprising:
an anode external electrode on the outer surface of the sealing body and electrically connected to the anode terminal region; and
a cathode external electrode on the outer surface of the sealing body and electrically connected to a conductive layer in the cathode formation region,
wherein the vent structure is located in a portion where neither the anode external electrode nor the cathode external electrode is located.

8. The solid electrolytic capacitor according to claim 1, wherein the vent structure is in a form of a rectangle with a cut out semicircle, a rectangle with a cut out triangle, a rectangle with two cut out triangles, a rectangle with a cut out oval, a rectangle with a cut out triangle with an oval at a vertex thereof, a rectangle with a cut out L-shape, a rectangle having a cut out oval in a direction diagonally to one side of the rectangle, a trapezoid, a triangle, or an L-shape.

9. A solid electrolytic capacitor comprising:
a capacitor element that has a valve-action metal substrate having an anode terminal region and a cathode formation region, a dielectric layer on the cathode formation region, a solid electrolyte layer on the dielectric layer, and a conductive layer on the solid electrolyte layer;
a sealing material that seals the capacitor element to form a sealing body; and
a vent structure embedded in the sealing material such that a portion of the vent structure is exposed on an outer surface of the sealing body, the vent structure being formed of a material having a melting point of 240° C. or lower, and including a thin wall portion having a partially short dimension in a direction from an inside of the sealing body toward the outer surface, as viewed from the top thereof,
the partially short dimension of the thin wall portion being shorter than a longest part dimension of the vent structure in the direction from the inside of the sealing body toward the outer surface,
the thin wall portion is not exposed on the outer surface of the sealing body, and
a part of the vent structure with the longest part dimension is exposed on the outer surface of the sealing body.

10. The solid electrolytic capacitor according to claim 9, wherein in a direction from the inside of the sealing body toward the outer surface of the sealing body, the partially short dimension of the thin wall portion is ½ or less of the longest part dimension of the vent structure.

11. The solid electrolytic capacitor according to claim 10, wherein the partially short dimension of the thin wall portion is ¹⁄₂₀ or more of the longest part dimension of the vent structure.

12. The solid electrolytic capacitor according to claim 9, wherein the partially short dimension of the thin wall portion is 0.02 mm to 0.8 mm.

13. The solid electrolytic capacitor according to claim 9, wherein the vent structure has a thickness of 10 μm to 1 mm.

14. The solid electrolytic capacitor according to claim 9, further comprising:

a lead frame connected to the anode terminal region or the cathode formation region and drawn out of the sealing material, wherein the vent structure is on a surface of the lead frame.

15. The solid electrolytic capacitor according to claim 9, further comprising:

an anode external electrode on the outer surface of the sealing body and electrically connected to the anode terminal region; and a cathode external electrode on the outer surface of the sealing body and electrically connected to a conductive layer in the cathode formation region, wherein the vent structure is located in a portion where neither the anode external electrode nor the cathode external electrode is located.

16. The solid electrolytic capacitor according to claim 9, wherein the vent structure is in a form of a rectangle with a cut out semicircle, a rectangle with a cut out triangle, a rectangle with two cut out triangles, a rectangle with a cut out oval, a rectangle with a cut out triangle with an oval at a vertex thereof, a rectangle with a cut out L-shape, a rectangle having a cut out oval in a direction diagonally to one side of the rectangle, a trapezoid, a triangle, or an L-shape.

\* \* \* \* \*